Figures 1, 2:
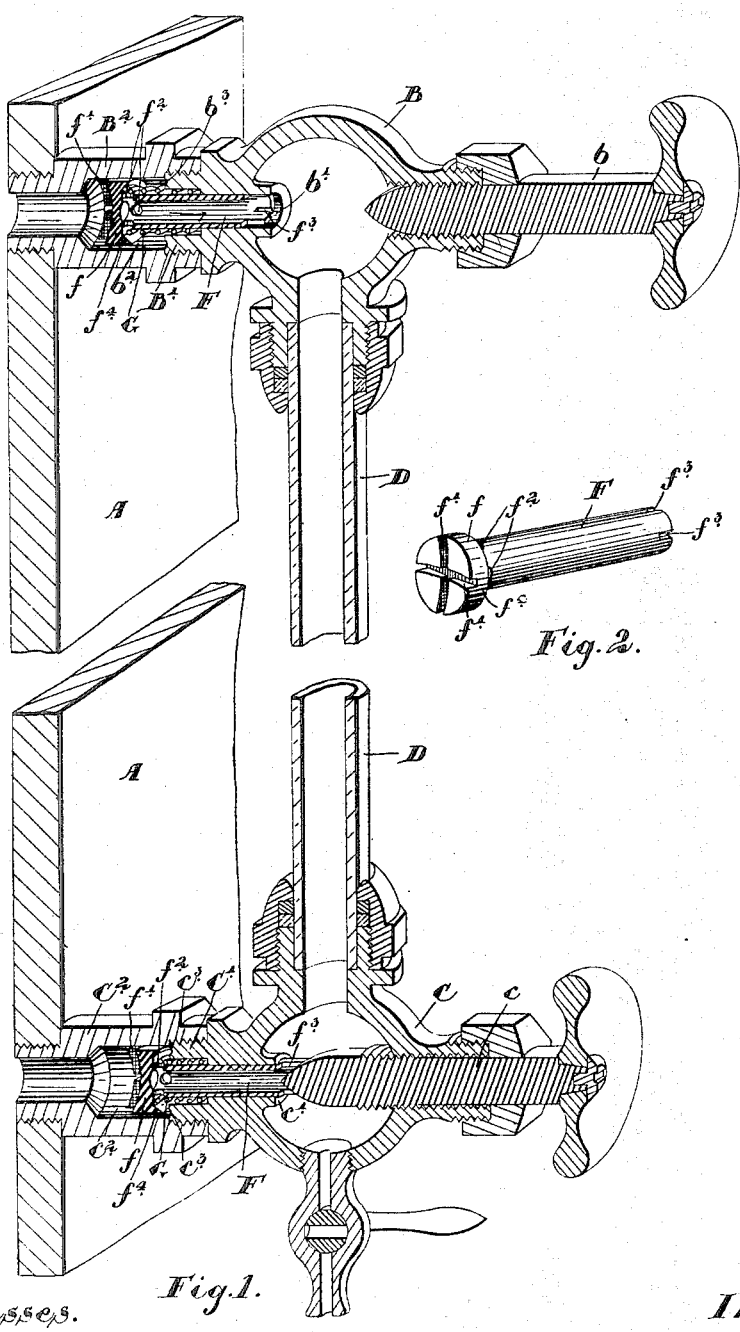

No. 640,328. Patented Jan. 2, 1900.
A. L. SCHRAM.
WATER GAGE.
(Application filed Mar. 18, 1899.)
(No Model.)

Witnesses.  Inventor.

UNITED STATES PATENT OFFICE.

ALEXANDER LUMSDEN SCHRAM, OF WOODSTOCK, CANADA.

WATER-GAGE.

SPECIFICATION forming part of Letters Patent No. 640,328, dated January 2, 1900.

Application filed March 18, 1899. Serial No. 709,667. (No model.)

*To all whom it may concern:*

Be it known that I, ALEXANDER LUMSDEN SCHRAM, manufacturer, of the town of Woodstock, in the county of Oxford, in the Province of Ontario, Canada, have invented certain new and useful Improvements in Water-Gages, of which the following is a specification.

My invention relates to improvements in water-gages; and the object of the invention is to devise a simple and effective emergency cut-off valve for water-gages which when a gage-glass breaks will effectually prevent any danger of scalding or accident by automatic closure to prevent the water and steam escaping; and it consists, essentially, of hollow tubular valves adapted to fit in the passage-ways leading from the interior boiler into the cocks and having a seat at one end of the cock, each valve being provided with a head having cross-slots next the boiler and holes leading into the interior next the head, and the opposite end being provided with notches, such valves being actuated as hereinafter more particularly explained.

Figure 1 is a sectional perspective view of a glass water-gage provided with my improved emergency cut-off valve. Fig. 2 is a perspective view of the valve-stem.

In the drawings like letters of reference indicate corresponding parts in each figure.

A is the end of the boiler, and B and C are the two cocks, which are provided with valve-stems $b$ and $c$, each of which screws into the body of the cock, as indicated.

D is the glass tube extending between the cocks.

$b'$ and $c'$ are the passage-ways leading into the cocks B and C.

The inner end of the each cock is provided with a threaded extension $B'$ and $C'$, onto which are screwed the extension-plugs $B^2$ and $C^2$, which are themselves suitably screwed into the end of the boiler. The extension-plugs have passage-ways extending through them provided with enlargements $b^2$ and $c^2$. The ends of the extensions $B'$ and $C'$ are provided with annular face-recesses $b^3$ and $c^3$.

F are the hollow valves, which fit within the passage-ways $b'$ and $c'$ leading into the cock. The valves F are cylindrical in form and provided with heads $f$, having cross-slots $f'$.

$f^2$ are openings leading into the interior of the hollow valve in proximity to the heads $f$.

$f^3$ are notches cut in the opposite end of the hollow valve.

G are light spiral springs extending into a recess in the threaded extensions.

In Fig. 1 I have shown one valve-stem $b$ partially withdrawn, and it will of course be understood that this is the ordinary position, although I have shown the lower one screwed inwardly, so as to come in contact with the end of the hollow valve. I have only shown this valve secured inwardly, however, to exemplify the operation of the stem in order to permit the easy access of the water into the gage-glass after it has been broken.

I shall now briefly describe the operation of my cut-off valve. Both stems $b$ and $c$ are set in the same position as that shown as to the stem $b$. The water in the boiler of course fills also the gage glass and cocks and passage-ways leading thereto. When the glass D is broken, which arises from various causes not necessary here to enumerate, the force of the water behind the heads $f$ forces them both forwardly in the direction indicated by arrow, so that the annular knife-edges $f^4$ at the front side of the head close into the annular recesses $b^3$ $c^3$, so that the supply of the water is immediately shut off from the gage-glass D. Of course the inner side of the head $f$ may be flat; but I prefer using the form described, as the knife, which serves to cut into the dirt which may be in the groove $b^3$, forms a perfectly water-tight joint. It will thus be seen that when the gage-glass D is broken there will be no danger of any scalding or other accident taking place, as merely the water in the gage-glass and gage-cocks will fall instead of being impelled or caused to spurt outwardly by the force of the water under pressure in the boiler.

It will be readily seen that a new glass may be inserted and the valve-stems $b$ and $c$ may be screwed inwardly, as shown, by the lower valve-stem, thereby allowing the water from the boiler to pass around the head $f$ of the valve F and through the holes $f^2$ into the interior of the valve, whence it passes out through the notches $f^3$ at the outer end of the valves into the cocks, and thence into the gage-tube.

Under ordinary circumstances the spiral spring G is unnecessary to force the head $f$ of the valve from its seat, and especially so in stationary boilers. In locomotive-work, however, it is preferable to have such a spring in order to hold the head midway in the enlargement $b^2$ of the plugs $B^2$, so that the water will readily pass around it without disturbing it, as otherwise the jarring of the locomotive might have a tendency to disturb the head and force it against its seat unnecessarily.

The cross-slots $f'$ hereinbefore described serve to allow of the passage of the water around the head should such head by unforeseen circumstances be forced against the inner end of the enlargement of the extension-plug. If such slots were not provided and the heads of the valve happened to be abutting the ends of the enlargement in the plugs, if the water fell in the boiler such gage-tube would be useless, as it would still remain filled with water instead of the level of the water in the boiler indicating on the tube.

I am aware that it is not new to provide valves in the cocks of gages for automatically shutting off the supply of water to the gage-glass, and I do not lay claim, broadly, to any such device.

What I claim as my invention is—

1. The combination with the boiler and gage-glass of a cock at each end of said glass, passages leading from the boiler to said glass through said cocks, valves located in said passages, each of said valves having an enlarged head with cross-slots in the face thereof, and a tubular stem having slotted ends, an inlet to said valve leading through said stem and valve-stems adapted to partly close said slotted stems, substantially as described.

2. The combination with a boiler and gage-glass with a passage connecting the same, of a valve controlling said passage having an enlarged head with slots in the face thereof, and a tubular stem, passages leading through said stem, the end of said stem being slotted, substantially as described.

ALEXANDER LUMSDEN SCHRAM.

Witnesses:
B. BOYD,
W. ARMS.